United States Patent [19]

Ennis

[11] E Patent Number: Re. 33,596

[45] Reissued Date of Patent: May 28, 1991

[54] SUPPORT FOR DISPLAY ITEMS OR THE LIKE

[75] Inventor: Jan S. Ennis, Redmond, Wash.

[73] Assignee: Ennco Display Systems, Inc., Redmond, Wash.

[21] Appl. No.: 399,903

[22] Filed: Aug. 29, 1989

Related U.S. Patent Documents

Reissue of:

[64] Patent No.: 4,830,203
Issued: May 16, 1989
Appl. No.: 109,059
Filed: Oct. 15, 1987

[51] Int. Cl.[5] ..... A47H 1/02

[52] U.S. Cl. ..... 211/105.2; 248/225.1; 248/902; 403/263; 403/361; 411/84

[58] Field of Search ..... 248/225.1, 223.4, 224.4, 248/224.3, 222.3, 220.2, 231.9, 501, 502, 902; 211/105.2; 411/84, 85; 403/361, 362, 377, 263, 192, 199

[56] References Cited

U.S. PATENT DOCUMENTS

| | | | |
|---|---|---|---|
| 2,831,808 | 4/1958 | Esseff et al. | 248/223.4 X |
| 2,859,710 | 11/1958 | Elsner | 248/223.4 X |
| 3,180,606 | 4/1965 | Sabin et al. | 248/222.3 X |
| 3,443,783 | 5/1969 | Fisher | 248/222.3 X |
| 4,343,245 | 8/1982 | Edwards | 403/361 X |
| 4,602,756 | 7/1986 | Chatfield | 248/225.1 |
| 4,645,393 | 2/1987 | Pletcher | 441/112 X |
| 4,724,966 | 2/1988 | Benaksas | 248/902 X |

FOREIGN PATENT DOCUMENTS

| | | | |
|---|---|---|---|
| 1112265 | 8/1961 | Fed. Rep. of Germany | 248/222.3 |
| 0077710 | 3/1962 | France | 248/222.3 |
| 2468784 | 5/1981 | France | 411/85 |
| 7510494 | 3/1976 | Netherlands | 248/222.3 |

*Primary Examiner*—Ramon O. Ramirez

[57] ABSTRACT

An easily movable display mounting system including a mounting cup (12) secured to a slot wall by a T-shaped fastener 26.

5 Claims, 1 Drawing Sheet

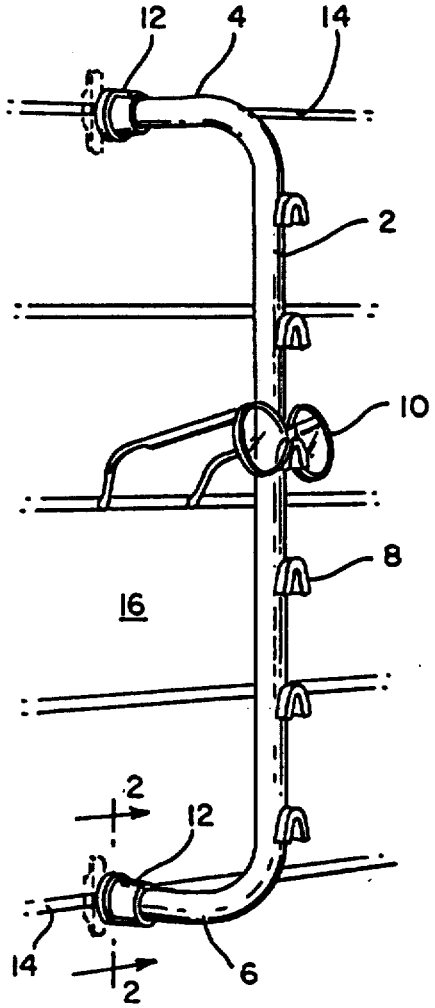
FIG. 1
FIG. 2
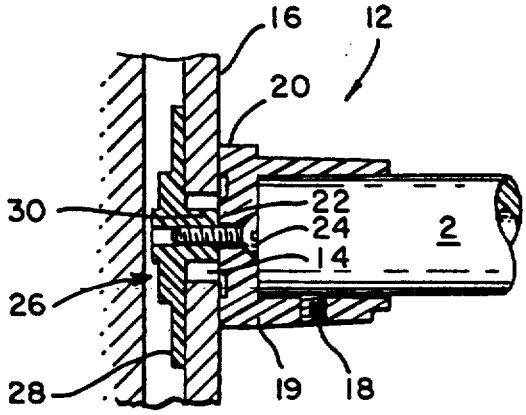
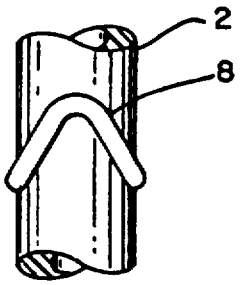
FIG. 4
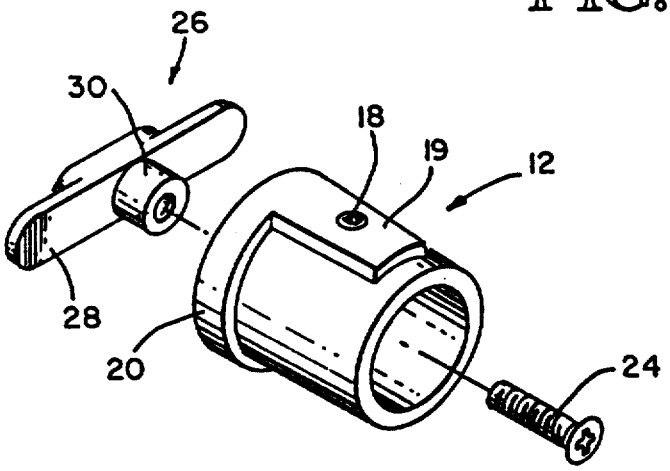
FIG. 3
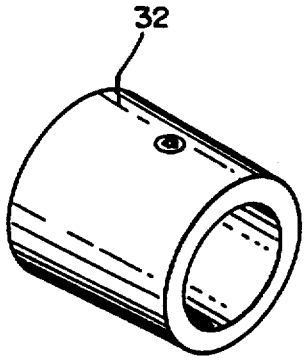
FIG. 5

SUPPORT FOR DISPLAY ITEMS OR THE LIKE

Matter enclosed in heavy brackets [ ] appears in the original patent but forms no part of this reissue specification; matter printed in italics indicates the additions made by reissue.

DESCRIPTION

1. Technical Field

This invention relates to a device for selectively securing display items to a wall or the like and more particularly to a means for quickly securing a cup-like attachment to a slotted support wall, whereby the display may be readily and easily moved or altered.

2. Background Art

The need for flexibility and adaptability in terms of display makeup at the point of purchase display locations is well known and recognized. The display must, in fact, emphasize the product as opposed to overwhelming it, must make the displayed items as attractive as possible and further must be of a non-permanent nature i.e. the retailer must have the ability to either change the products being displayed or the particular location or configuration of the display.

In order to achieve the versatility needed, retailers and others who use point of purchase display have adopted universal unobstrusive support systems such as vertical slot walls to accept shelving brackets or the like. The slot walls permit unskilled persons to quickly and easily move shelf support brackets to new and different locations and configurations.

Some items are more attractively displayed on supports other than shelves and an accommodation should be made for alternate displays.

Prior art patents known to the inventor include U.S. Pat. No. 683,248 granted to Chase which discloses a structure for holding a hook in the slot of a slotted molding.

U.S. Pat. No. 2,831,808 granted to Esseff discloses a fastener for holding a support member of a rack in a slot.

DISCLOSURE OF THE INVENTION

With the above noted prior art in mind it is an object of the present invention to provide a fastener means whereby a display rod or the like may be quickly and easily secured to a slot wall.

Another object of the present invention is to provide a display rod which will accommodate a plurality of display items which and wherein the rod may be quickly and easily secured at either end in a slot wall allowing the person in charge of the display to mount display rods at various angles and locations.

Still a further object of the present invention is to provide an easily removable mounting cup for supporting display rods such that the cut may be quickly and easily installed and removed permitting a rapid change of display configuration.

Still a further object of the present invention is to provide a display rod mounting cup wherein the cup is placed against the exterior surface of the slot wall and a captured T-nut which is capable of passing through the slot is inserted and is rotated through 90 degrees and compressed against the interior of the slot wall, securing the cup in place.

BRIEF DESCRIPTION OF THE DRAWINGS

FIG. 1 is an environmental view showing the inventive mounting cups in use supporting a display rod such as would be used for spectacles.

FIG. 2 is a sectional view along lines 2—2 of FIG. 1 depicting the interrelationship of the various elements.

FIG. 3 is an exploded view of the securement means itself.

FIG. 4 is a detail view of the frame support.

FIG. 5 is a view of a second embodiment of the securement means.

BEST MODE FOR CARRYING OUT THE INVENTION

As seen in FIG. 1, a display rod, in this case illustrated as a wide, U-shaped acrylic rod 2 having legs 4 and 6 and including outwardly projecting inverted V-shaped supports 8 to support a spectacle frame 10, is shown mounted to a horizontal slot wall. Legs 4 and 8 are inserted and secured to the quick release securement means 12 which is held in position spanning a slot 14 in a slot wall 16.

Reference is now had to FIG. 2 where it can be seen that the acrylic rod 2 is held in position within the cup designated as 12, by means of a set screw 18 passing through a reinforced portion 19 of the sidewall of the cup 12. The bottom of the cup is formed including an axially projecting ring 20 which seats against the wall 16 surrounding a central reinforced portion 22 which includes a central bore coaxially with a cup 12. A T-fastener 26, having arms 28 and a stem 30 said arms having a first thickness adjacent the stem and a lesser thickness at the ends, is of such a dimension that when parallel to the slot 14, it will pass therethrough and when secured in position by screw 24 projecting through the bore in portion 22, it will abut the inner surface of wall 16 holding the cup 12 in position.

As seen more clearly in FIG. 3, the cup 12 includes a thickened wall portion 19, 20 at locations subjected to greater stress and the T-fastener is preferably a unitary molded element of predetermined dimensions to fit well with the particular slot wall.

As seen in FIG. 5, a second alternate embodiment of the cup is shown wherein the side wall [33] *32* is of sufficient thickness to not require the additional reinforcing as at 19 in FIG. 3.

Thus, as can be seen, the present invention provides a quick and easy means to secure and to alter displays utilizing slot walls as a support means. The securement is inexpensive and may be used by persons of average skill.

I claim:

1. A display system for spectacle frames or the like, wherein the frames are displayed in vertical arrays, each of said frames resting upon a nose piece secured to a vertical display member, said vertical display member removably secured by a securing device to a slot wall wherein the securing device includes an outwardly open cup member including an axially, rearwardly extending peripheral edge assuring uniform contact with the wall and an axially, rearwardly extending central portion for contact with [member] a securing element, said securing element having a base which extends through the slot of the slot wall, said cup member having its base adjacent the wall, the securing element being of a T-shape in cross-section having a [base member] *stem* and opposing arm members extending rearwardly from the bottom [base] *bottom* of the cup member wherein the [base] *stem* of the securing element is removably fastened to the [axially rearwardly extending central base portion] *bottom* of the cup and said [base] *stem* of the securing element is of a length to assure the arm members abut the back of the slot wall when in position and the base member being of a thickness that enables passage through the slot, the arm members being of a first thickness adjacent the base and of a second lesser thickness at the ends to accommodate variance in wall thickness, said arms of a dimension to enable them to pass through the slot of the wall when parallel thereto and to bridge the slot when perpendicular thereto whereby the cup and attached T-shaped securing member can be placed adjacent the wall with the T-shaped securing member extending through the slot, the securing member rotated through 90° and the cup and the subsequently secured display are then secured to the slot wall.

2. A display system as in claim 1, wherein the vertical members are secured within the cup by locking screws.

3. A display system as in claim 1, wherein the cup member includes a portion which is thickened for additional strength.

*4. A display system for spectacle frames or the like, wherein the frames are displayed in arrays, each of said frames resting upon a nose piece secured to a display member, said display member removably secured by a securing device to a slot wall wherein the securing device includes an outwardly open cup member having a bottom for contact with the wall and with a securing element, said securing element having a base which extends through the slot of the slot wall, the securing element being of a T-shape in cross-section having a stem and opposing arm members extending rearwardly from the bottom of the cup member wherein the stem of the securing element is removably fastened to the bottom of the cup and said stem of the securing element is of a length to assure the arm members abut the back of the slot wall when in position and the base member being of a thickness that enables passage through the slot, the arm members being of a first thickness adjacent the stem and of a second lesser thickness at the ends to accommodate variance in wall thickness, said arms of a dimension to enable them to pass through the slot of the slot wall when parallel thereto and to bridge the slot when perpendicular thereto whereby the cup and attached T-shaped securing member can be placed adjacent the wall with the T-shaped securing member extending through the slot, the securing member rotated through 90° and the cup and the subsequently secured display members are thus secured to the slot wall.*

*5. A display system as in claim 4, wherein the display members are secured within the cup by locking screws.*

* * * * *